(12) United States Patent
Lee

(10) Patent No.: US 12,017,390 B2
(45) Date of Patent: Jun. 25, 2024

(54) APPARATUS FOR MANUFACTURING MIXTURE COMPOSITION OF ORGANIC AND INORGANIC MATERIAL AND METHOD FOR MANUFACTURING MIXTURE COMPOSITION OF ORGANIC AND INORGANIC MATERIAL USING THE SAME

(71) Applicant: Jaeho Lee, Bucheon-si (KR)

(72) Inventor: Jaeho Lee, Bucheon-si (KR)

( * ) Notice: Subject to any disclaimer, the term of this patent is extended or adjusted under 35 U.S.C. 154(b) by 59 days.

(21) Appl. No.: 17/460,409

(22) Filed: Aug. 30, 2021

(65) Prior Publication Data
US 2022/0063148 A1 Mar. 3, 2022

(30) Foreign Application Priority Data
Sep. 2, 2020 (KR) .......................... 10-2020-0111492

(51) Int. Cl.
*B29C 43/00* (2006.01)
*C08J 11/06* (2006.01)
*B29K 105/26* (2006.01)

(52) U.S. Cl.
CPC ............ *B29C 43/003* (2013.01); *C08J 11/06* (2013.01); *B29K 2105/26* (2013.01); *C08J 2300/30* (2013.01)

(58) Field of Classification Search
None
See application file for complete search history.

(56) References Cited

U.S. PATENT DOCUMENTS

| 2,595,455 A * | 5/1952 | Heston ..................... B29B 7/429 366/89 |
| 2013/0184391 A1* | 7/2013 | Kojima ..................... G02B 1/04 524/413 |

FOREIGN PATENT DOCUMENTS

| JP | 2002-066525 A | 3/2002 |
| JP | 2014-046239 A | 3/2014 |
| KR | 20-0188313 Y1 | 7/2000 |
| KR | 10-2014-0103405 A | 8/2014 |
| KR | 10-1523660 B1 | 5/2015 |
| KR | 10-1972832 B1 | 4/2019 |

OTHER PUBLICATIONS

Machine translation of Harai et al. (JP2002-066525) (Year: 2002).*

* cited by examiner

*Primary Examiner* — Robert J Grun
(74) *Attorney, Agent, or Firm* — KORUS Patent, LLC; Seong Il Jeong

(57) ABSTRACT

The present invention provides an apparatus for manufacturing a mixture composition of organic and inorganic material and a method for manufacturing a mixture composition of organic and inorganic material using the apparatus, which can significantly increase the recycling rate of waste plastic or waste vinyl and minimize environmental pollution, by producing a block manufactured by effectively mixing organic polymers and inorganic soil.

2 Claims, 10 Drawing Sheets

APPARATUS FOR MANUFACTURING MIXTURE COMPOSITION OF ORGANIC AND INORGANIC MATERIAL AND METHOD FOR MANUFACTURING MIXTURE COMPOSITION OF ORGANIC AND INORGANIC MATERIAL USING THE SAME

FIELD OF THE INVENTION

The present invention relates to an apparatus for manufacturing a mixture composition of organic and inorganic material and a method for manufacturing a mixture composition of organic and inorganic material using the apparatus.

BACKGROUND OF THE INVENTION

Currently, waste plastic or waste vinyl generated in Korea is increasing by 12% annually. However, waste plastic has not been effectively recycled, and more than half of the waste plastic has been incinerated or buried. The incineration and landfill of waste plastic have contaminated water and atmosphere, causing serious environmental problems. As a result, there is a growing interest in recycling waste plastic.

The current recycling technology of waste plastic has a low recycling rate depending on the pollution level of waste plastic and shows a low economic feasibility. Accordingly, it is classified to a waste disposal field, which requires government support, rather than to a profitable business.

Since some waste plastic are recycled, but most of them are disposed of by landfill or incineration, it causes serious resource waste and environmental pollution.

The prior art documents are Korean Patent No. 10-1523660, entitled "Flooring Material for Parking Lot Using Soil Asphalt Mixture", published on May 28, 2015, and Korean Patent No. 10-1475137, entitled "Ecogreen Method for Pretreatment, Separation, and Retreatment and Recycling of Separated Material", published on Aug. 27, 2014, The purpose of the present invention is to provide an apparatus for manufacturing a mixture composition of organic and inorganic material and a method for manufacturing a mixture composition of organic and inorganic material using the apparatus. The invention can increase the recycling rate of waste plastic or waste vinyl and minimize environmental pollution caused by waste plastic, by producing a block manufactured by effectively mixing organic polymers and inorganic soil.

SUMMARY OF THE INVENTION

According to the desired embodiments of the present invention, an apparatus for manufacturing a mixture composition of organic and inorganic material comprising: an organic material pretreatment part pretreating an organic material by transferring an organic polymer to a first conveyor belt and mixing the organic polymer through a stirrer; an inorganic material pretreatment part pretreating an inorganic material by transferring an inorganic soil to a second conveyor belt and pulverizing the inorganic soil through a disk mill; a mixing part including a hopper that the organic material and the inorganic material are supplied into, and mixing the organic and inorganic material, by rotating a first screw connected to the hopper; a consolidation part including a consolidation body that the mixture of the organic and inorganic material mixed in the first screw is supplied into, and by rotating a second screw connected to the consolidation body, pressing out the mixture and eliminating air bubbles in the mixture, and a forming part producing a block by compressing the mixture supplied from the consolidation part through a forming device.

The organic material pretreatment part may include: a screw inside the stirrer, an exhaust unit installed on an upper part of the stirrer and emitting gas inside the stirrer, and a heat supply unit installed on one side of the stirrer and supplying heat into the stirrer.

The inorganic material pretreatment part may include a plurality of cylindrical members inside the disk mill and pulverizes the inorganic material by rotating and vibrating using power of a motor.

The inorganic material pretreatment part may include a discharge pipe installed on one side of the disk mill to discharge the pulverized inorganic material, a preheating pipe connected to the discharge pipe and heating the pulverized inorganic material, and an inlet that is installed on the disk mill and that the inorganic material is supplied into.

Each of the first screw and the second screw may include a cylindrical case on an outer surface thereof and a material supply inlet on one side of the case.

A heat wire may be wound on an outer circumference surface of each of the cases of the first screw and the second screw to apply heat to the mixture of organic and inorganic material.

A diameter of the second screw may be minimum at a position adjacent to the material supply inlet and is maximum at a position farthest from the material supply inlet.

The forming part may include: a cover slidably installed on the upper part of the forming device; molding fixing members spaced apart from each other by a constant distance and installed on the upper part of the cover to fix the molding; a molding moving cylinder moving the molding passing between the molding fixing members, and a molding discharging member discharging the molding moved by the molding moving cylinder.

A method for manufacturing a mixture composition of organic and inorganic material according to the present invention comprises: an organic material pretreatment step supplying organic polymers into the organic material pretreatment part, mixing the organic polymers with heat treatment through the stirrer, and discharging the pretreated organic material, an organic material pretreatment step supplying inorganic soil into the inorganic material pretreatment part, pulverizing the inorganic soil using the disk mill with heat treatment, and inhaling and discharging dust of the inorganic soil generated during the organic material pretreatment, a mixing and consolidating step supplying the discharged organic polymers and inorganic soil into the hopper, mixing the organic polymers and inorganic soil with heat treatment using the first screw, consolidating the mixture of the organic polymers and inorganic soil with heat treatment using the second screw, and removing air bubbles of the mixture, and a forming step supplying the mixture into the forming part, and compressing and cooling the molding through the forming device, thereby producing a block, The forming step may include processes of filling the forming device with molding, compressing the filled molding with a pressure of 5 to 10 MPa, and discharging a block processed by compressing the molding.

Technical Effects of the Invention

According to embodiments of the present invention, the recycling rate of waste plastic or waste vinyl is significantly increased by producing a block manufactured by effectively mixing organic polymers and inorganic soil.

In addition, since waste plastic can be used effectively, the waste problem in farming and fishing villages can be solved, thereby minimizing environmental pollution.

DETAILED DESCRIPTION EMBODIMENTS OF THE INVENTIONS

Hereafter, the present invention will be explained in conjunction with the accompanying drawings. The embodiments disclosed below are not restricting or limiting the scopes of the inventive concepts and can be embodied in various forms. In addition, detailed explanation regarding related elements or functions, which are well known to a person of ordinary skill in the art, will be omitted in case it may obscure the gist of the present invention.

Figure 1:
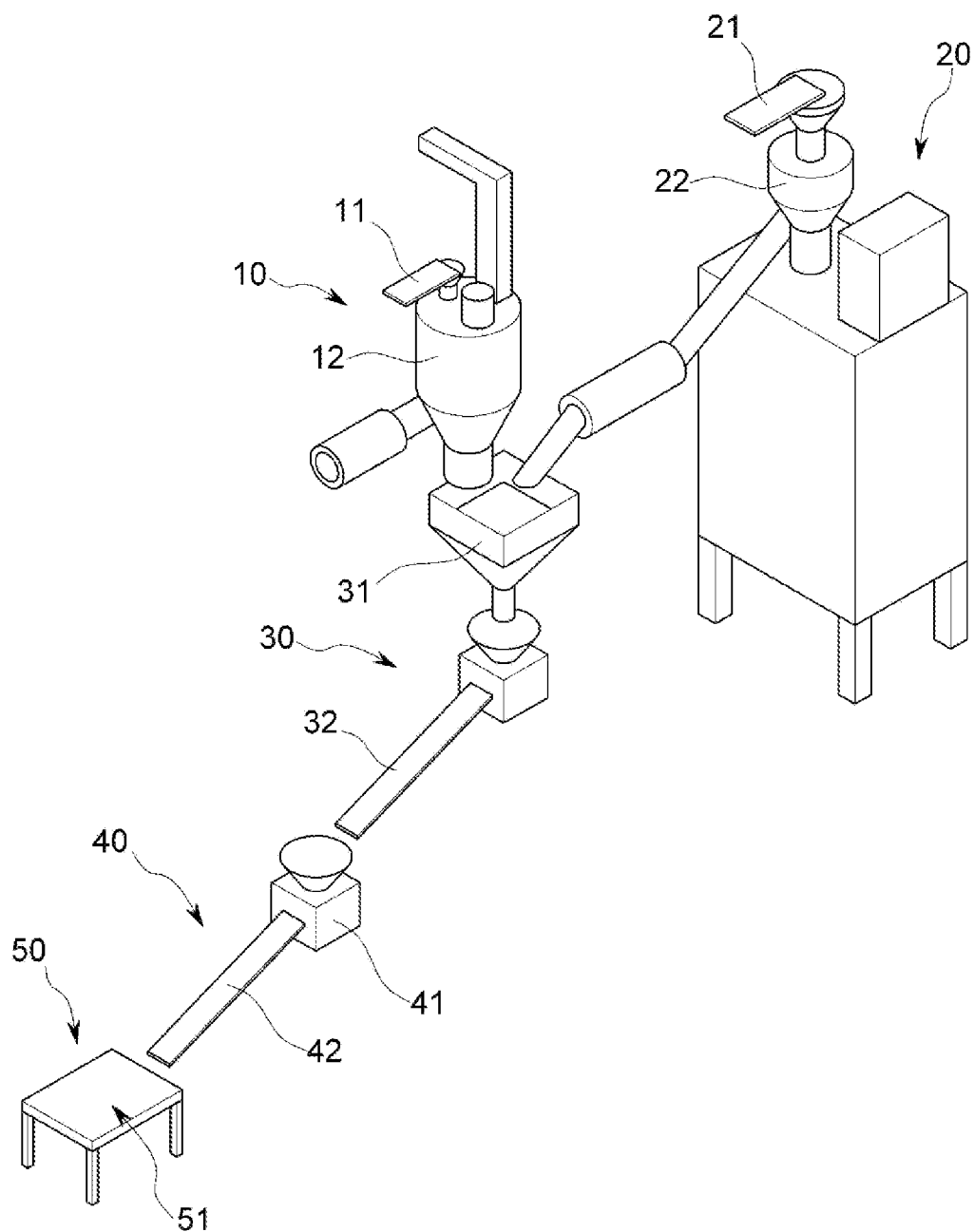
FIG. 1 is a drawing of an apparatus for manufacturing a mixture composition of organic and inorganic material according to one embodiment of the present invention.

FIG. 1 is a drawing of an apparatus for manufacturing a mixture composition of organic and inorganic material according to one embodiment of the present invention.

Referring to FIG. 1, the apparatus 1 for manufacturing a mixture composition of organic and inorganic material according to the present invention comprises: an organic material pretreatment part 10, an inorganic material pretreatment part 20, a mixing part 30, a consolidation part 40, and a forming part 50. An organic material and an inorganic material are combined into one composition through the apparatus 1, and the composition can be produced as a block that can be recycled.

In this embodiment, the organic material pretreatment part 10 of the apparatus 1 pretreats an organic material by transferring organic polymers to a first conveyor belt 11 and mixing the organic polymers through a stirrer 12. In this instance, polymer materials such as waste plastic or waste vinyl may be used. The collected waste plastic or waste vinyl is put into the stirrer 12 and pretreated by being mixed through the stirrer 12.

The inorganic material pretreatment part 20 pretreats an inorganic material by transferring inorganic material to a second conveyor belt 21 and pulverizing the inorganic material through a disk mill 22. In this instance, an inorganic soil may be used. The inorganic soil is pretreated through pulverization to be mixed with the organic material.

In addition, the mixing part 30 includes a hopper 31, which the organic and inorganic material are put into. A first screw 32 connected to the hopper 31 rotates and mixes the organic and inorganic material. The consolidation part 40 includes a consolidation body 41, which a mixture of the organic and inorganic material mixed in the first screw 32 is put into. A second screw 42 connected to the consolidation body 41 rotates and presses out the mixture of the organic and inorganic material, eliminating air bubbles.

The forming part 50 produces a block by compressing the mixture supplied from the consolidation part 40. Therefore, the apparatus 1 enables waste resources to be recycled by combining organic polymers such as waste plastic or waste vinyl and inorganic material such as soil and producing a block that can be used in various ways.

In other words, the apparatus 1 for manufacturing a mixture composition of organic and inorganic material pretreats an organic material to manufacturable material through the organic material pretreatment part 10; pretreats an inorganic material to manufacturable material through the inorganic material pretreatment part 20; mixes the pretreated organic and inorganic material through the mixing part 30; removes air bubbles and presses out the mixture through the consolidation part 40 to the forming part 50, and produces a block by compressing the mixture through a forming device 51.

Figure 2:
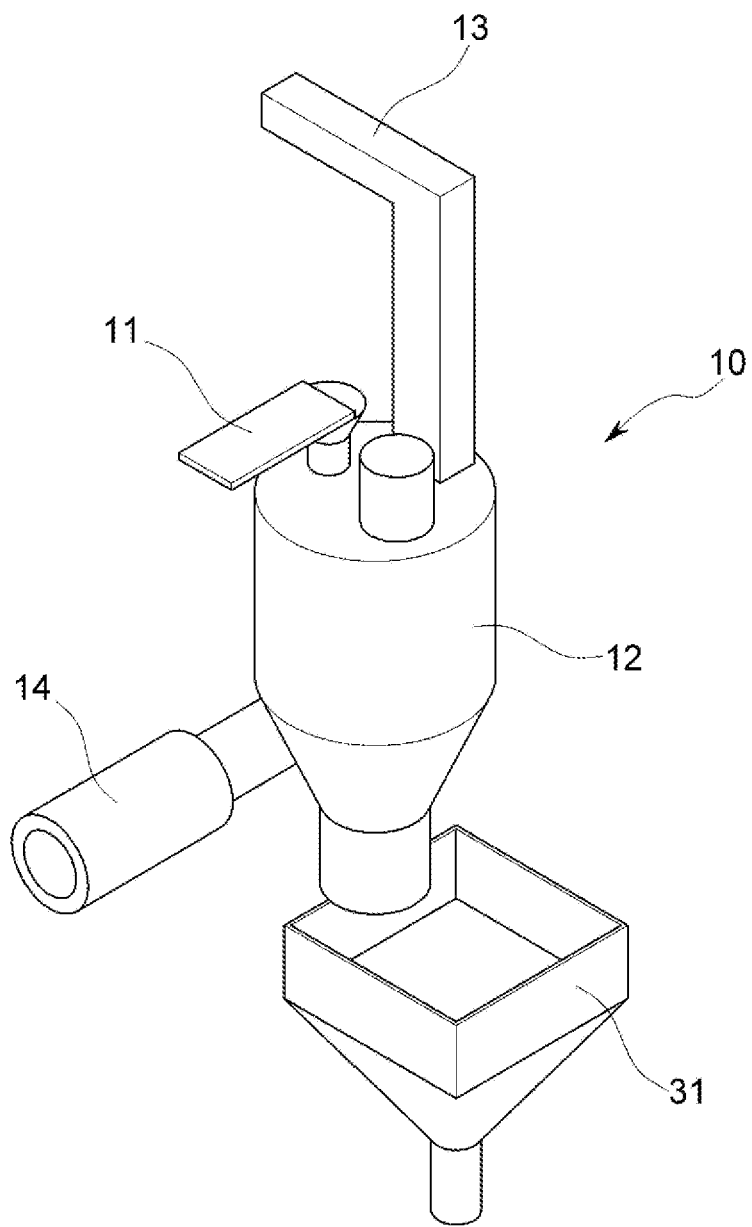
FIG. 2 is a drawing of an organic material pretreatment part of the apparatus for manufacturing a mixture composition according to one embodiment of the present invention.

FIG. 2 is a drawing of an organic material pretreatment part of the apparatus for manufacturing a mixture composition according to one embodiment of the present invention.

Referring to FIG. 2, the organic material pretreatment part 10 heat-treats while mixing the organic material. The organic material pretreatment part 10 can pretreat the organic material to a reusable material by mixing with heat treatment.

Thus, the organic material pretreatment part 10 includes a screw (not shown) inside the stirrer 12; an exhaust unit 13 installed on the upper part of the stirrer 12 and emitting gas inside the stirrer 12, and a heat supply unit 14 installed on one sides of the stirrer 12 and supplying heat into the stirrer 12.

In other words, the organic material pretreatment part includes the stirrer 12, the exhaust unit 13, and the heat supply unit 14, mixes the organic material using the screw of the stirrer 12, emits gas generated during the mixing process to the outside through the exhaust unit 13, and heat-treats the organic material while mixing through the heat supply unit 14 for exchanging heat inside the stirrer 12.

Figure 3:
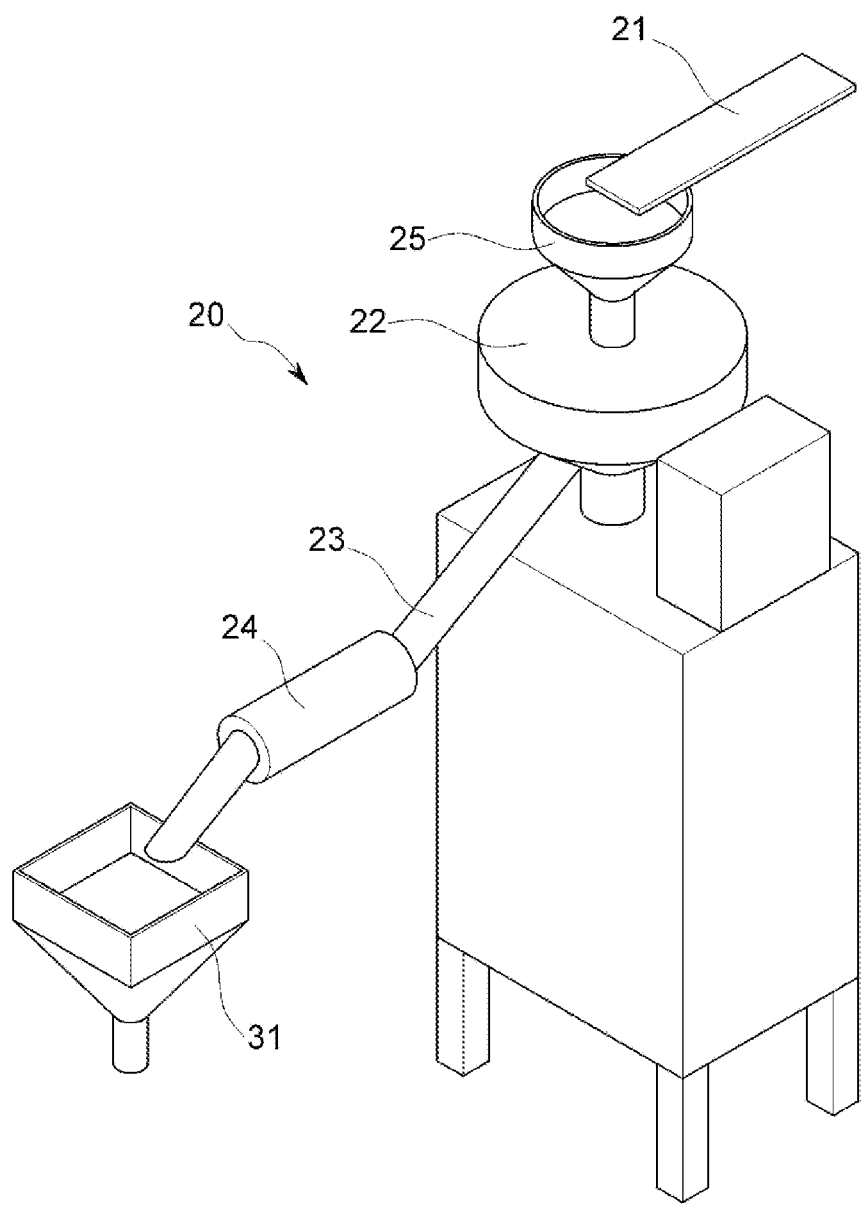
FIG. 3 is a drawing of an inorganic material pretreatment part of the apparatus for manufacturing a mixture composition according to one embodiment of the present invention.
Figure 4:
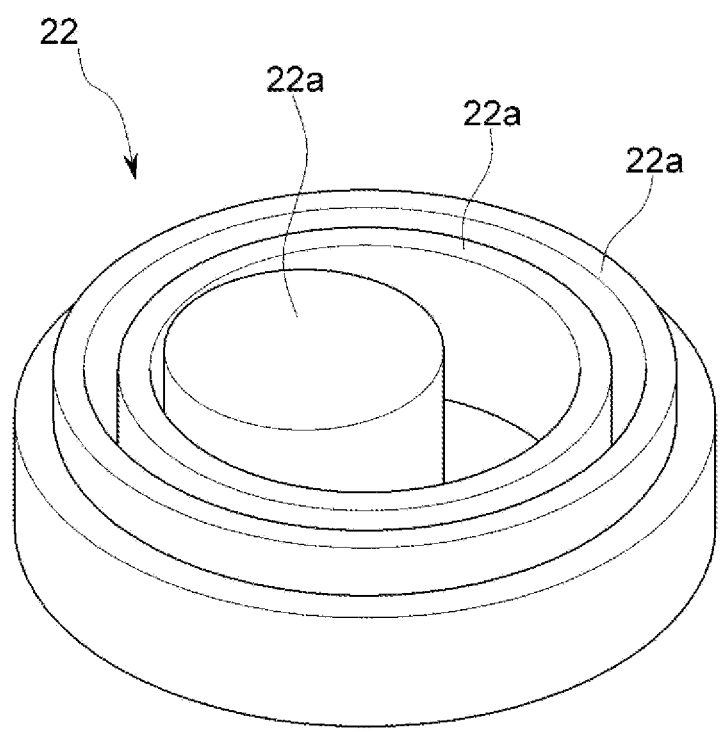
FIG. 4 is a drawing of a disk mill structure of the organic material pretreatment part according to one embodiment of the present invention.

FIG. 3 is a drawing of an inorganic material pretreatment part of the apparatus for manufacturing a mixture composition according to one embodiment of the present invention. FIG. 4 is a drawing of a disk mill structure of the organic material pretreatment part according to one embodiment of the present invention.

Referring to FIGS. 3 and 4, the inorganic material pretreatment part 20 includes a plurality of cylindrical member 22a inside the disk mill 22. The inorganic material pretreatment part 20 can pulverize the inorganic material by rotating and vibrating with power of a motor.

In addition, the inorganic material pretreatment part 20 may include a discharge pipe 23 installed on one side of the disk mill 22 to discharge the ground inorganic material; a preheating pipe 24 connected to the discharge pipe 23 and heating the ground inorganic material, and an inlet 25 that is installed on the disk mill 22 and that the inorganic material is put into.

A separate dust inlet (not shown) may be installed adjacent to the inlet 25 to inhale and discharge the dust of the inorganic material generated from the disk mill 22.

Thus, the inorganic material is pulverized using the cylindrical member 22a of the disk mill 22, and the dust generated in this process is discharged to the outside through the dust inlet. The pulverized inorganic material 22 is heated through the preheating pipe 24, and may be supplied to the hopper 31 to mix with the organic material.

Figure 5:
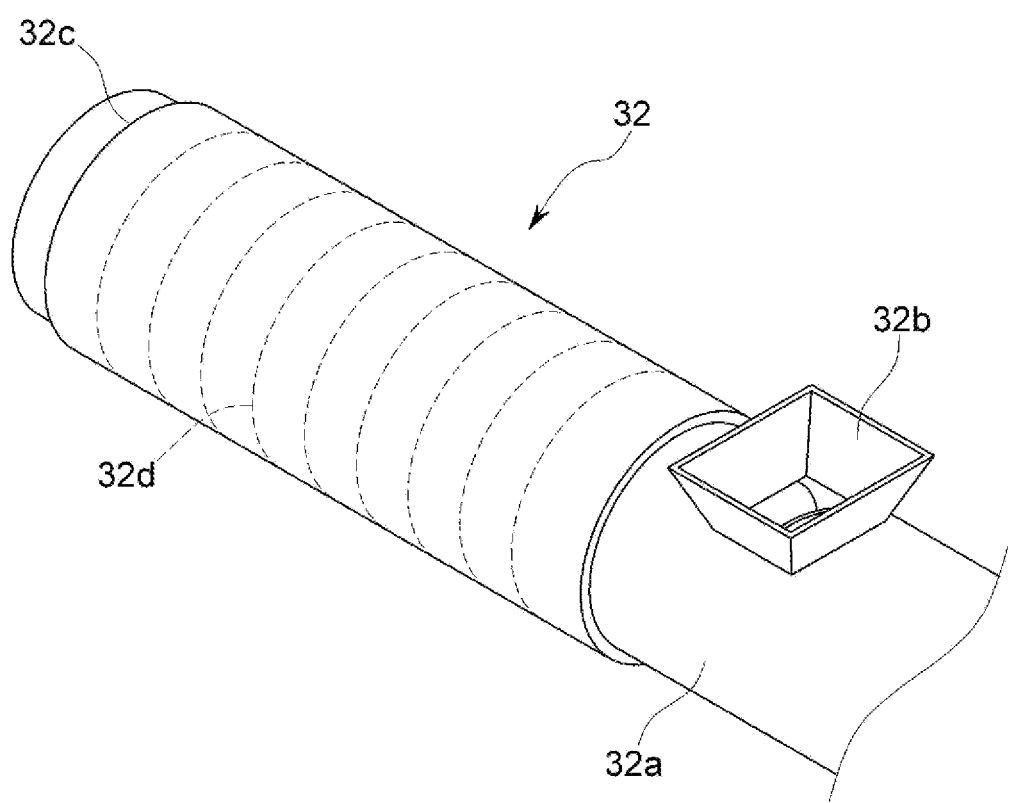
FIG. 5 is a drawing of a first screw of the apparatus for manufacturing a mixture composition according to one embodiment of the present invention.
Figure 6:
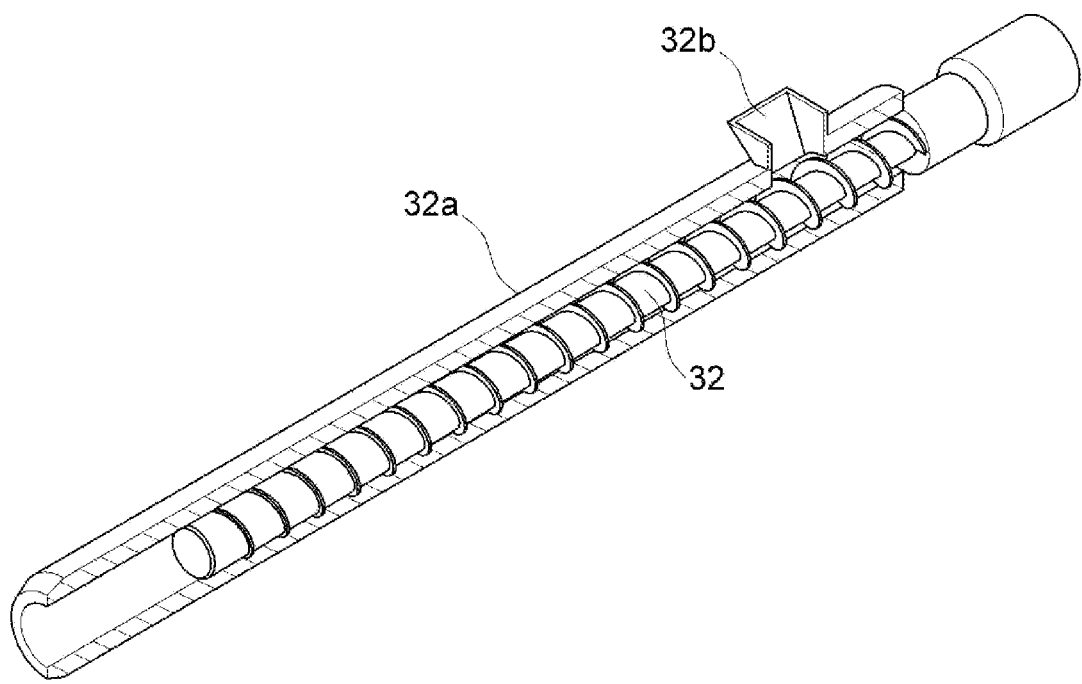
FIG. 6 is a drawing of the inner structure of the first screw according to one embodiment of the present invention.
Figure 7:
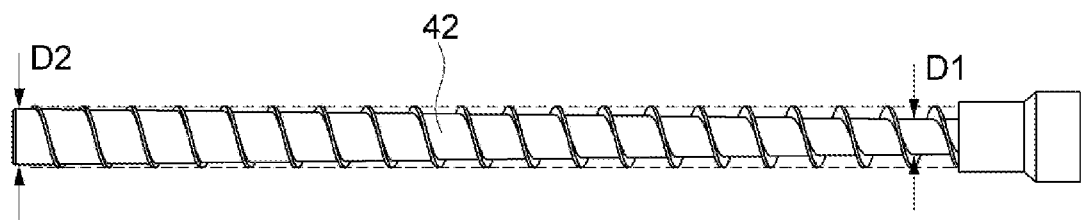
FIG. 7 is a drawing of a second screw of the apparatus for manufacturing a mixture composition according to one embodiment of the present invention.

FIG. 5 is a drawing of a first screw of the apparatus for manufacturing a mixture composition according to one embodiment of the present invention. FIG. 6 is a drawing of the inner structure of the first screw according to one embodiment of the present invention. FIG. 7 is a drawing of a second screw of the apparatus for manufacturing a mixture composition according to one embodiment of the present invention.

Referring to FIGS. 5 to 7, each of the first screw 32 and the second screw 42 may have a cylindrical case 32a, 42a on the outer surface thereof and a material supply inlet 32b, 42b for supplying material to one side of the case 32a, 42a. When the organic and inorganic material are supplied to the material supply inlet 32b of the first screw 32, the first screw 32 rotates to mix the organic and inorganic material.

The first screw 32 is an extrusion screw used to press out or extrude organic material, which is waste plastic in a flake state. The first screw 32 can effectively extrude organic material by increasing output using a pipe screw or a mixing screw with a wide screw blade.

In addition, the heat supply member 32c is wound on the outer circumference surface of the case 32a of the first screw 32 to apply heat to the mixture of organic and inorganic materials. In this instance, a heat wire 32d may be used for the heat supply member 32c. Likewise, the second screw 42 may also heat the outer circumference surface of the case.

Figure 9:
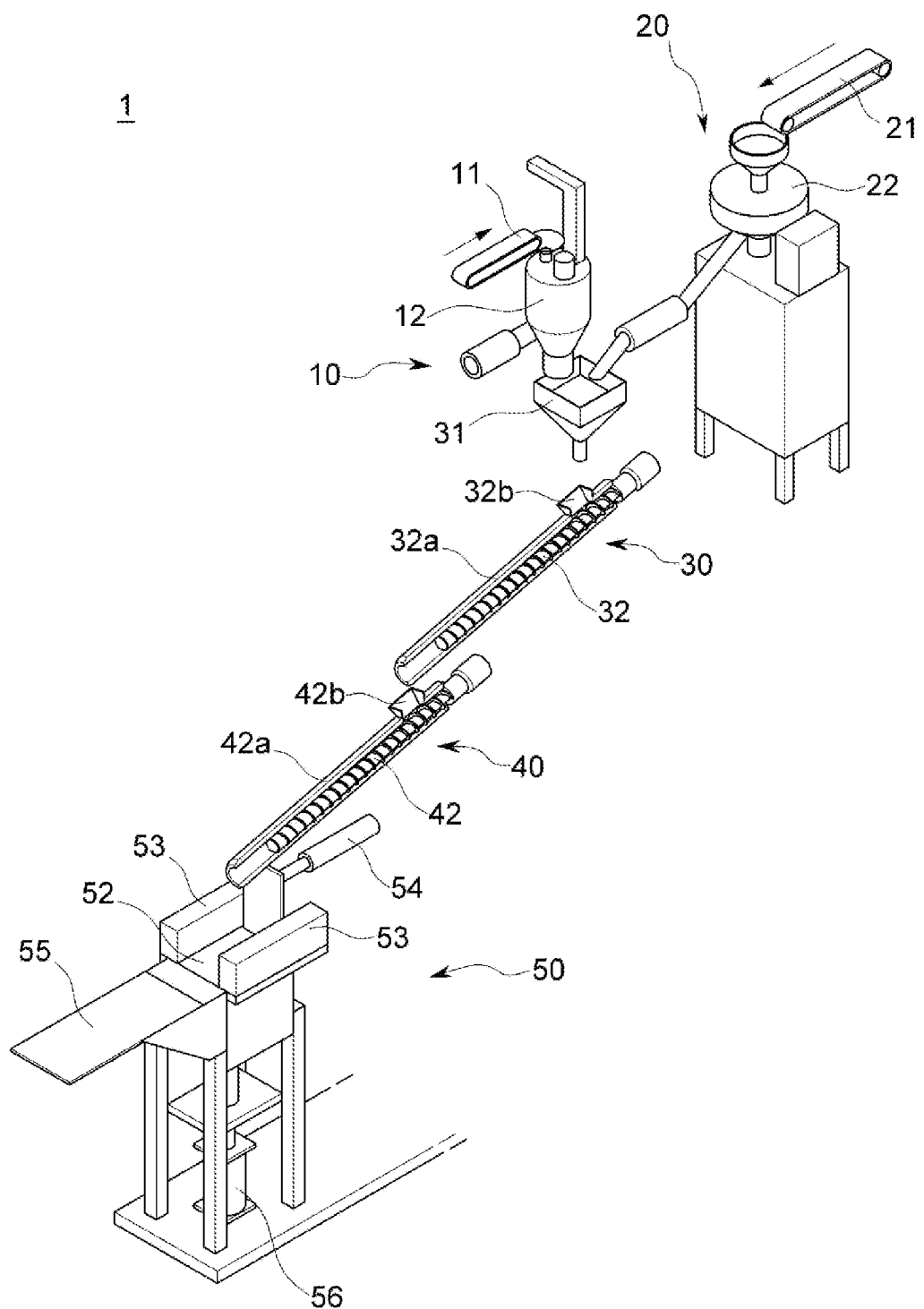
FIG. 9 is a drawing of an entire system of an apparatus for manufacturing a mixture composition according to one embodiment of the present invention.

In this embodiment, referring to FIG. 9 together, the second screw 42 has a structure in which a diameter D1 of the second screw 42 adjacent to the material supply inlet 42b is minimum, and a diameter D2 of the second screw 42 farthest from the material supply inlet 42b is maximum.

In other words, the case 42a of the second screw 42 has a constant diameter, but the diameter of the second screw 42 increases towards the outer end of the case 42a. The design of the second screw 42 having a minimum starting point diameter D1 and a maximum end point diameter D2 can improve efficiency of mixture extrusion and bubble removal.

Figure 8:
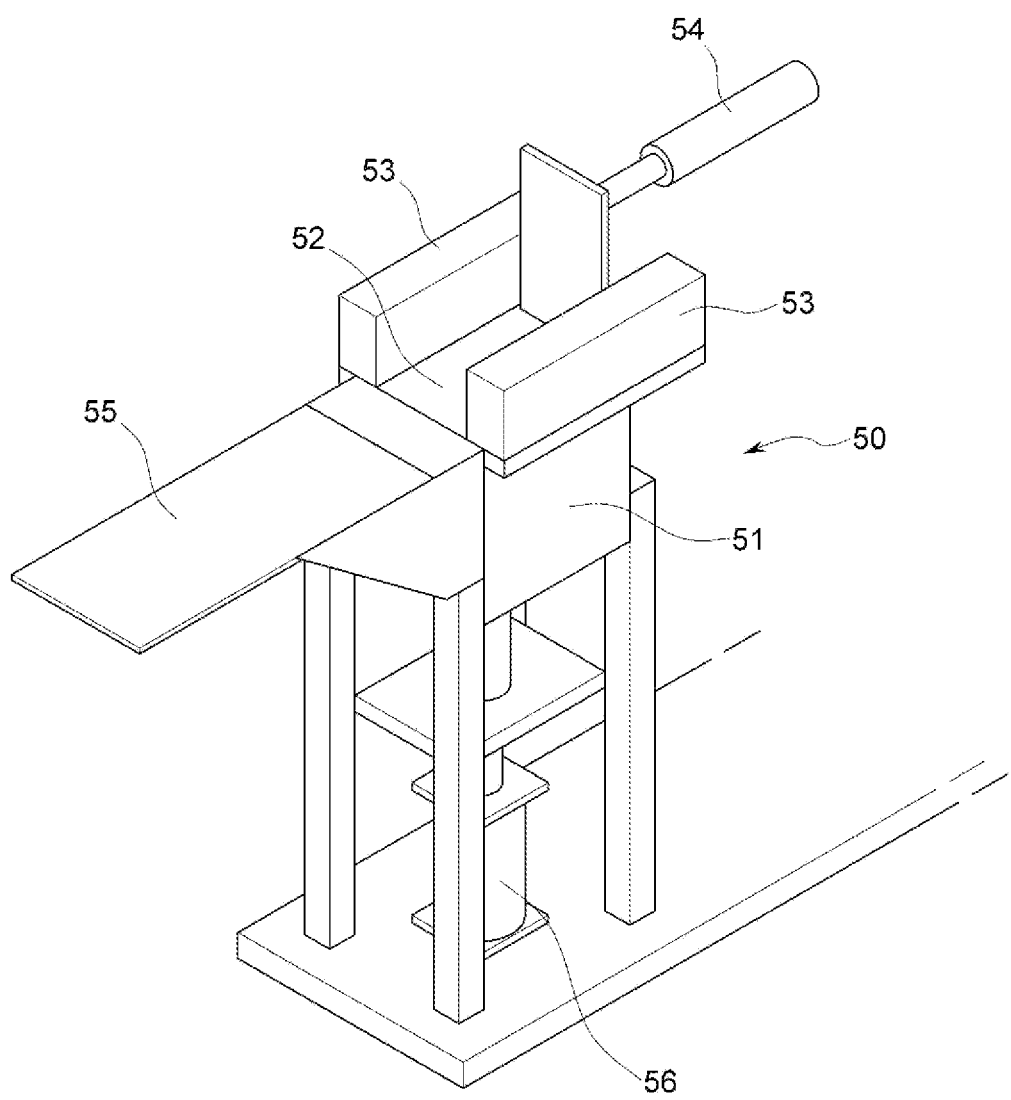
FIG. 8 is a drawing of a forming part of the apparatus for manufacturing a mixture composition according to one embodiment of the present invention.

FIG. 8 is a drawing of a forming part of the apparatus for manufacturing a mixture composition according to one embodiment of the present invention.

Referring to FIG. 8, the forming part 50 may include a cover 52 slidably installed on the upper part of the forming device 51; molding fixing members 53 spaced apart from each other by a constant distance and installed on the upper part of the cover 52 to fix the molding; a molding moving cylinder 54 moving the molding passing between the molding fixing members 53, and a molding discharging member 55 discharging the molding moved by the molding moving cylinder 54.

On the lower part of the forming device 51, a compressing cylinder 56 moving vertically and compressing the molding inside the forming device 51 is installed.

In other words, when the molding is filled inside the forming device 51, and the compression cylinder 56 is operated to apply pressure to the molding inside the forming device 51, the block made of the mixture can be produced. After cooling the molding inside forming device 51 and discharging the molding to the outside, the molding moving cylinder 54 is operated to push the molding to the molding discharging member 55 to produce the block. The cover 52 covers the forming device 51 when the molding is compressed, and when the molding is molded, the cover 52 slides to one side to open the forming device 51 so that the molding can be discharged to the outside.

FIG. 9 is a drawing of an entire system of an apparatus for manufacturing a mixture composition according to one embodiment of the present invention.

Referring to FIG. 9, the apparatus 1 for manufacturing a mixture composition of organic and inorganic material stirs organic material that is put into the stirrer 12 through the first conveyor belt 11, pulverizes inorganic material that is put into the disk mill 22 through the second conveyor belt 21, heats the stirrer 12 and the disk mill 22, respectively, and puts the pretreated organic and inorganic material into the hopper 31 together.

The mixture in the hopper 31 is put into the material supply inlet 32b of the first screw 32, and the first screw 32 rotates and extrudes the mixture for the next step. The extruded mixture is put into the material supply inlet 42b of the second screw 42, and the second screw 42 rotates and extrudes the mixture, removing the air bubbles.

The molding, the processed mixture described above, is supplied to the forming device 51 and produced to a block through compression. Since the block is manufactured by mixing organic material made of waste plastic or waste vinyl and inorganic material made of soil, resources can be recycled and minimize environmental pollution caused by waste plastic or waste vinyl.

Figure 10:
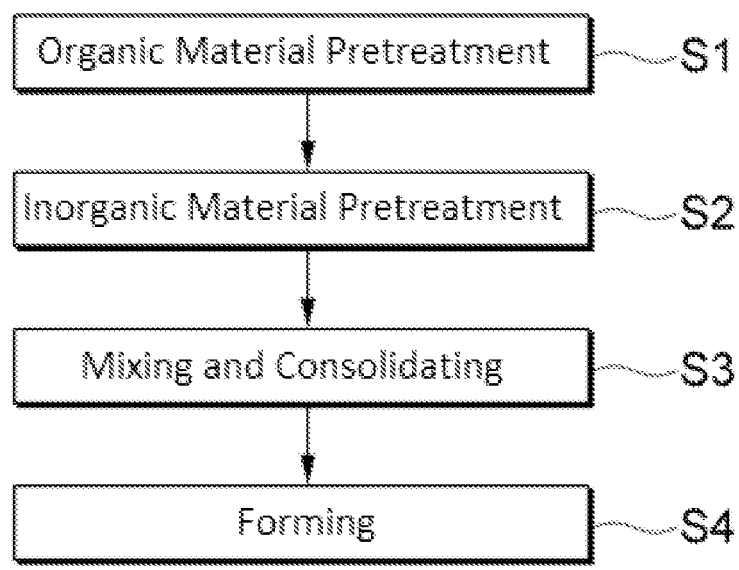
FIG. 10 is a flow chart of a method for manufacturing a mixture composition of organic and inorganic material using the apparatus according to one embodiment of the present invention.
Figure 11:
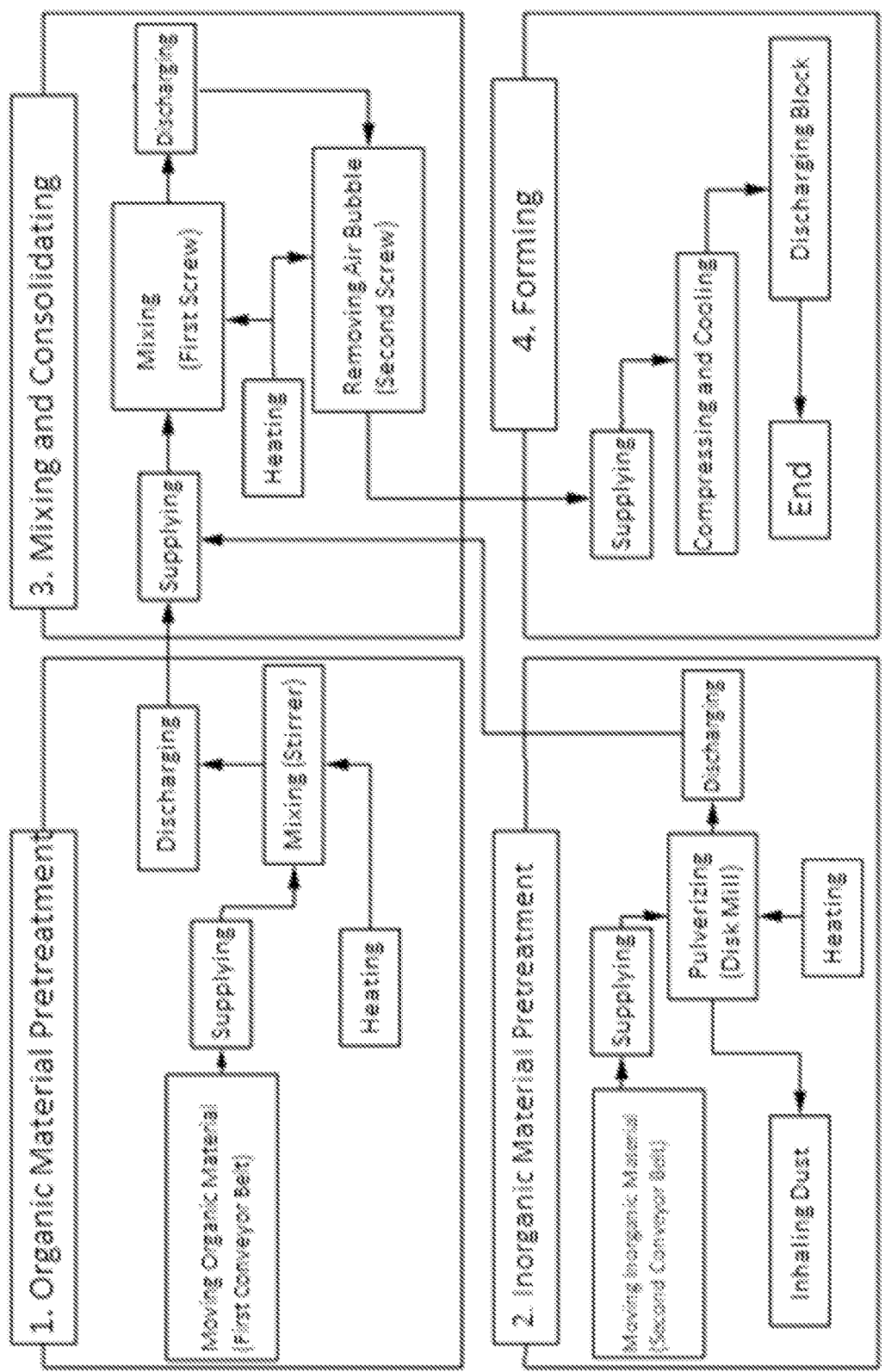
FIG. 11 is a drawing of a detailed process of the method for manufacturing a mixture composition of organic and inorganic material using the apparatus according to one embodiment of the present invention.

FIG. 10 is a flow chart of a method for manufacturing a mixture composition of organic and inorganic material using the apparatus according to one embodiment of the present invention. FIG. 11 is a drawing of a detailed process of the method for manufacturing a mixture composition of organic and inorganic material using the apparatus according to one embodiment of the present invention.

Referring to FIGS. 10 and 11, the method for manufacturing a mixture composition according to the present invention is a process of combining organic polymers and inorganic soil to produce one composition. In this instance, the composition may be produced as a certain product such as a block.

In this embodiment, the method for manufacturing a mixture composition comprises: an organic material pretreatment step S1 pretreating organic material; an inorganic material pretreatment step S2 pretreating inorganic material; a mixing and consolidating step S3 mixing and consolidating the pretreated organic and inorganic material, and a forming step S4 molding the mixed material.

The organic material pretreatment step S1 includes processes of putting organic polymers into the organic material pretreatment part 10, mixing the organic polymers with heat treatment through the stirrer 12, and discharging the pretreated organic material.

The organic material pretreatment step S1 includes processes of putting inorganic soil into the inorganic material pretreatment part 20, pulverizing the inorganic soil using the disk mill 22 with heat treatment, and inhale and discharge the dust of the inorganic soil generated during the pretreatment process.

The mixing and consolidating step S3 include processes of putting the discharged organic polymers and inorganic soil into the hopper 31, mixing the organic polymers and inorganic soil with heat treatment using the first screw 32, consolidating the mixture of the organic polymers and inorganic soil with heat treatment using the second screw 42, and removing air bubbles of the mixture.

The forming step S4 includes processes of putting the mixture into the forming part 50, and compressing and cooling the molding through the forming device 51, thereby producing a block.

In addition, the forming step S4 may include processes of filling the forming device 51 with molding, compressing the filled molding with a pressure of 5 to 10 MPa, and discharging a block processed by compressing the molding.

The method for manufacturing a mixture composition enables effective production of processed goods by synthesizing organic and inorganic material using less energy. Thus, the method for manufacturing a mixture composition can produce blocks by mixing organic material made of waste plastic or waste vinyl and inorganic material made of soil.

According to an apparatus 1 for manufacturing a mixture composition and a method for manufacturing a mixture composition using the apparatus, the recycling rate of waste plastic or waste vinyl is significantly increased by producing a block manufactured by effectively mixing organic polymers and inorganic soil.

In addition, since waste plastic can be used effectively, the waste problem in farming and fishing villages can be solved, thereby minimizing environmental pollution.

While embodiments of the present invention have been described, the present invention is not limited to what has been particularly shown. It would be apparent that many more modifications and variations than mentioned above are possible by an ordinary person skilled in the art. The scope of the present invention includes scopes of appended claims, modifications, and variations.

What is claimed is:

1. An apparatus for manufacturing a mixture composition of organic and inorganic material, the apparatus comprising:
   an organic material pretreatment part pretreating an organic material by transferring an organic polymer to a first conveyor belt and mixing the organic polymer through a stirrer;
   an inorganic material pretreatment part pretreating an inorganic material by transferring an inorganic soil to a second conveyor belt and pulverizing the inorganic soil through a disk mill;
   a mixing part including a hopper that the organic material and the inorganic material are supplied into, and mixing the organic and inorganic material, by rotating a first screw connected to the hopper;
   a consolidation part including a consolidation body that the mixture of the organic and inorganic material mixed in the first screw is supplied into, and by rotating a second screw connected to the consolidation body, pressing out the mixture and eliminating air bubbles in the mixture, and
   a forming part producing a block by compressing the mixture supplied from the consolidation part through a forming device,
   wherein the inorganic material pretreatment part includes a plurality of cylindrical members inside the disk mill and pulverizes the inorganic material by rotating and vibrating using power of a motor,
   wherein the inorganic material pretreatment part includes a discharge pipe installed on one side of the disk mill to discharge the pulverized inorganic material, a preheating pipe connected to the discharge pipe and heating the pulverized inorganic material, and an inlet that is installed on the disk mill and that the inorganic material is supplied into,
   wherein a dust inlet is installed adjacent to the inlet to inhale and discharge dust of the inorganic material generated from the disk mill,
   wherein each of the first screw and the second screw includes a cylindrical case on an outer surface thereof and a material supply inlet on one side of the case,
   wherein a heat wire is wound on an outer circumference surface of each of the cases of the first screw and the second screw to apply heat to the mixture of organic and inorganic material,
   wherein a diameter of the second screw is minimum at a position adjacent to the material supply inlet, is maximum at a position farthest from the material supply inlet, and increases toward the position farthest from the material supply inlet,
   wherein the forming part includes:
   a cover slidably installed on the upper part of the forming device;
   molding fixing members spaced apart from each other by a constant distance and installed on the upper part of the cover to fix the molding;
   a molding moving cylinder moving the molding passing between the molding fixing members, and
   a molding discharging member discharging the molding moved by the molding moving cylinder.

2. The apparatus of claim 1, wherein the organic material pretreatment part includes:
   a screw inside the stirrer,
   an exhaust unit installed on an upper part of the stirrer and emitting gas inside the stirrer, and
   a heat supply unit installed on one side of the stirrer and supplying heat into the stirrer.

* * * * *